(12) United States Patent
Wigren

(10) Patent No.: US 9,106,319 B2
(45) Date of Patent: Aug. 11, 2015

(54) METHOD AND ARRANGEMENT FOR INTERFERENCE CONGESTION CONTROL

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/306,207

(22) Filed: Nov. 29, 2011

(65) Prior Publication Data
US 2012/0140618 A1 Jun. 7, 2012

Related U.S. Application Data

(60) Provisional application No. 61/419,447, filed on Dec. 3, 2010.

(51) Int. Cl.
*H04B 1/7103* (2011.01)
*H04L 12/26* (2006.01)

(52) U.S. Cl.
CPC .......... *H04B 1/7103* (2013.01); *H04L 43/0882* (2013.01)

(58) Field of Classification Search
CPC ............ H04W 52/04; H04W 72/0486; H04W 72/1252
USPC ........... 370/252, 253, 329–338; 455/63.1–65, 455/67.13
See application file for complete search history.

(56) References Cited

U.S. PATENT DOCUMENTS

| | | | |
|---|---|---|---|
| 6,675,004 B1 * | 1/2004 | Waylett | 455/304 |
| 2004/0258035 A1 | 12/2004 | Fan et al. | |
| 2008/0198802 A1 * | 8/2008 | Zhang et al. | 370/329 |
| 2009/0170523 A1 * | 7/2009 | Jain et al. | 455/452.1 |
| 2009/0207746 A1 * | 8/2009 | Yuan et al. | 370/252 |
| 2009/0325509 A1 * | 12/2009 | Mattisson et al. | 455/75 |
| 2011/0255432 A1 * | 10/2011 | Sambhwani et al. | 370/252 |

FOREIGN PATENT DOCUMENTS

| | | |
|---|---|---|
| EP | 2256961 A1 | 12/2010 |
| WO | 2008/097145 A1 | 8/2008 |

OTHER PUBLICATIONS

Wigren, T. et al. "Estimation of Uplink WCDMA Load in a Single RBS." 66th IEEE Vehicular Technology Conference, Sep. 30,-Oct. 3, 2007.
Dahlman, E. et al. "Wider-Band 'Single-Carrier' Transmission." 3G Evolution, Second Edition: HSPA and LTE for Mobile Broadband, Elsevier Ltd., 2008, Chapter 5, p. 65.
Wigren, T. "Recursive Noise Floor Estimation in WCDMA." IEEE Transactions on Vehicular Technology, vol. 59, No. 5, Jun. 2010.
Wigren, T. "Soft Uplink Load Estimation in WCDMA." IEEE Transactions on Vehicular Technology, vol. 58, No. 2, Feb. 2009.

* cited by examiner

*Primary Examiner* — Pao Sinkantarakorn
(74) *Attorney, Agent, or Firm* — Murphy, Bilak & Homiller, PLLC

(57) ABSTRACT

In a method of uplink interference congestion control in an interference suppression capable receiving node associated with a plurality of users in a wireless communication system, applying interference suppression to received signals in the node, to provide interference suppressed received signals. Subsequently, estimating a rise over thermal value for the uplink, based on the interference suppressed received signals, and determining a load measure for the uplink based on the estimated rise over thermal value. Finally, controlling interference congestion on the uplink based on the determined load measure.

25 Claims, 10 Drawing Sheets

METHOD AND ARRANGEMENT FOR INTERFERENCE CONGESTION CONTROL

RELATED APPLICATIONS

This application claims priority to U.S. Provisional Application No. 61/419,447 filed Dec. 3, 2010.

TECHNICAL FIELD

The present invention concerns congestion control in wireless communication systems, in particular fast interference congestion control in interference suppression capable wireless communication systems.

BACKGROUND

Present day wireless communication systems, such as WCDMA (Wideband Code Division Multiple Access) continue to evolve to support high bit rate applications. As data rates increase, so does interference and self-interference from the dispersive radio channels, which in turn severely limits performance. In order to combat these problems, advanced receivers for WCDMA terminal platforms and base stations are continually being developed and further improved. Consequently, in future versions of mobile communication systems like WCDMA, Interference Suppression (IS) will be used in order to achieve better performance in terms of e.g. peak data rates, coverage, system throughput and system capacity.

Typically, the user equipment (UE)s of the WCDMA uplink (UL) are subject to so called fast inner loop power control. These power control loops steer the powers of each user, to achieve a set signal to interference plus noise ratio (SINR) target for the connection of the UEs. This in turn means that all power control loops are coupled nonlinearly, via the SINR (Signal and interference plus noise ratio) measurement (the so-called party effect). In other words, if one UE feels the need to increase its power, as a result all other UEs will feel a need to further increase their power. It is well established in the literature that the loops stay stable as long as the uplink (UL) is operating below its pole capacity. However, when the system is close to the pole capacity, stability is reduced and so called power rushes can occur. This is a very significant problem in WCDMA since the power control loops are very fast and capable of stepping up the UE power with as much as 1500 dB/second. Means that prevent such power rushes are therefore a necessity in case the UL of the WCDMA system is to be operated close to the pole capacity.

In order to alleviate the effects of the above described power surges, one commonly used method is the so called fast congestion control (FCC). The method acts to interrupt the power control loop in case of occurring power surges, thereby preventing UEs from trying to increase their respective power. FCC may use various measurements to achieve its goal, however a high bandwidth measurement of, or associated with, the WCDMA UL load is a necessary ingredient.

However, for systems utilizing interference suppression capable receivers a number of problems occur that prevent FCC from being an effective means to prevent power surges. Some of these problems include:

A first problem is caused by the fact that with IS receivers the power control loops are closed after IS processing. There is no established way to measure or estimate the load after IS.

A second problem is that FCC will become too conservative in case the load measures available for the WCDMA UL, without IS receivers are used. This is because a higher load than what is seen after IS is used for FCC.

A third problem is that IS receivers are sometimes more sensitive to the overall interference situation of the WCDMA UL. The stability of the UL power control loops of IS receivers can therefore be foreseen to become more prone to power runaway, than the loops of conventional receivers.

A fourth problem is the fact that in order to maximize the throughput more and more aggressive scheduling is used; a fact that further increases the risk of power rushes in the future.

Therefore, the need for FCC is deemed to become increasingly important with the introduction of IS receivers in the WCDMA UL.

Consequently, there is a need for methods and arrangements enabling taking interference suppression into account when determining load for use in fast congestion control in WCDMA systems.

SUMMARY

The present disclosure aims to obviate some of the above-mentioned problems, and to provide improved congestion control in interference suppression capable wireless communication systems.

According to a first aspect, the present disclosure presents a method of uplink interference congestion control in an interference suppression capable receiving node associated with a plurality of users in a wireless communication system. The method includes the steps of applying interference suppression to received signals in the node, to provide interference suppressed received signals, and estimating a rise over thermal value for the uplink, based on interference suppressed received signals. Further, the method includes the step of determining a load measure for the uplink based on the estimated rise over thermal value, and controlling interference congestion on the uplink based on the determined load measure.

According to a second aspect, the present disclosure presents an arrangement for interference congestion control in an interference suppression capable receiving node associated with a plurality of users in a wireless communication system. The arrangement includes an interference suppression unit configured to apply interference suppression to received signals in the node, to provide interference suppressed received signals, and an estimating unit configured to estimate a rise over thermal value for the uplink, based on the interference suppressed received signals. Further, the arrangement includes a load determining unit configured to determine a load measure for the uplink based on the estimated rise over thermal value, and a control unit configured to control interference congestion on the uplink based on the determined load measure.

Advantages of various embodiments described in the present disclosure include enabling measurement of load in terms of rise over thermal after interference suppression processing, and controlling congestion on the uplink based on the load situation after interference suppression processing.

BRIEF DESCRIPTION OF THE DRAWINGS

The invention, together with further objects and advantages thereof, may best be understood by referring to the following description taken together with the accompanying drawings, in which.

DETAILED DESCRIPTION

Figure 1:
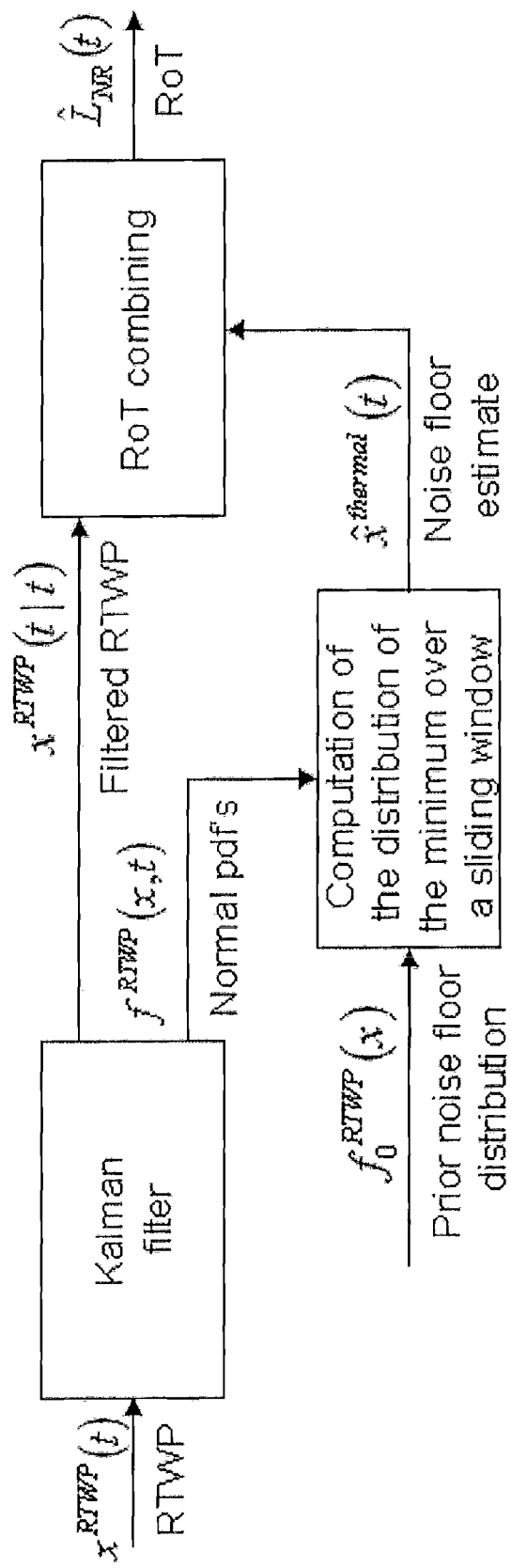
FIG. 1 is a schematic flow diagram of a method of rise over thermal estimation.

Throughout the drawings, the same reference numbers are used for similar or corresponding elements.

The present disclosure is described in the context of a WCDMA wireless communication system. In particular, the disclosure concerns the impact of the introduction of interference suppression capable receivers in such systems on load measurements and congestion control e.g. interference congestion control, in such systems. Examples of interference suppressing receivers that are important for the present disclosure include a plurality of linear receivers, e.g. G-rake+, FDE (frequency domain equalization) and FDPE (frequency domain pre equalization) receivers.

The inventor has identified the need for providing load measures after interference suppression processing in IS capable receivers e.g. G-Rake+, FDPE, FDE receivers, as well as a need for utilizing those load measures in order to effectively control interference congestion e.g. for fast interference congestion control.

For prior art receivers without interference suppression or interference cancellation capabilities, a load at the antenna connector is given by the so called noise rise or rise over thermal. For further information concerning load measurements and WCDMA inner loop power control in present day systems without interference suppression capable receivers e.g. Rake receivers, the interested reader is guided towards Annex 1 and Annex 2, together with FIG. 1 and FIG. 2 of this disclosure. In short, the fingers of a Rake receiver extract signal energy from delayed signal images by despreading and combining them. The Rake receiver coherently combines the finger outputs using complex conjugates of estimated channel coefficients to estimate the modulation symbols. Each despread value consists of a signal component, an interference component, and a noise component. When combining the values, the Rake receiver aligns the signal components so that they add to one another. As data rates increase, greater self-interference from dispersive radio channels limit performance. In order to handle self-interference the so called a G-rake (Generalized Rake) receiver has been developed, which functions like an equalizer, suppressing self-interference.

In a G-Rake receiver, in contrast to a plain Rake receiver, extra interference fingers are user to collect information about interference on the signal fingers. This is used to cancel interference in the signal fingers. In addition to estimating the channel, the G-Rake receiver estimates the correlations between the interference plus noise on different fingers. This information is used to suppress interference. The channel estimate and interference plus noise correlation estimates are used to form the combining weights. As a result the combining process collects signal energy and suppresses interference. Consequently, the G-Rake receiver combines the despread values to cancel interference and increase the signal component, whereas the normal Rake receiver only maximizes the signal component.

A particular form of G-Rake receiver is the so-called G-Rake+. To explain the difference between the two receiver concepts, it is noted that they only differ in the way the impairment matrix R_u is computed. The G-Rake is also denoted the parametric G-Rake, which points to the fact that the impairment matrix is estimated via a model believed to be relevant for the case. The G-Rake+ receiver is in contrast denoted the non-parametric G-Rake. In this case, the impairment matrix is estimated from measurements of an unused uplink code i.e. a code that is not used for data transmission of any user in the cell. In this manner the energy on this code represents a mix of transmissions from neighbor cells and energy "leaking" from the transmission of the own cell. The assumption is that this energy is representative of the interference experienced by the users of the cell. Experiments indicate that this is a valid assumption. The contributions from the unused code are first despread and then rank 1 contributions from a number of symbols are summed up to give R_u.

In order to provide an insight to the above mentioned problems associated with interference suppression capable receivers, a detailed description of three different examples of linear receivers, e.g. G-rake+, FDPE, FDE receivers, follow below.

A first example of such an interference suppression capable linear receiver is the G-rake+ receiver. The difference with an interference suppressing G-rake+ receiver as compared to a conventional Rake receiver is that each user sees a reduced level of interference, immediately after the weight combining step. In a G-rake+ receiver, a covariance matrix $\hat{R}_u$, u=1, . . . , U, with the order equal to the number of fingers is first estimated to capture the interference. The spreading codes not used by the present user u may be used in order to estimate $\hat{R}_u$.

The G-rake+ receiver uses the estimated covariance matrix that models the interference for computation of the combining weights for the users u, u=1, . . . , U, according to Equation 1 below:

$$\hat{R}_u \hat{w}_u = \hat{h}_u, u=1, \ldots, U,$$  (1)

where $\hat{h}_u$, u=1, . . . , U, is the net channel response of user u and where $\hat{w}_u$ are the combining weights.

The effect of Equation 1 is that the G-rake+ receiver essentially whitens the correlated interference and removes large spectral peaks from interferers at certain finger locations and for certain antenna elements.

Note that the G-rake+ receiver is a linear receiver. There is a related type of IS receiver for WCDMA which is also linear, denoted the chip equalizer. The difference between the G-rake+ receiver and the chip equalizer is the order of certain basic operations.

Figure 3:
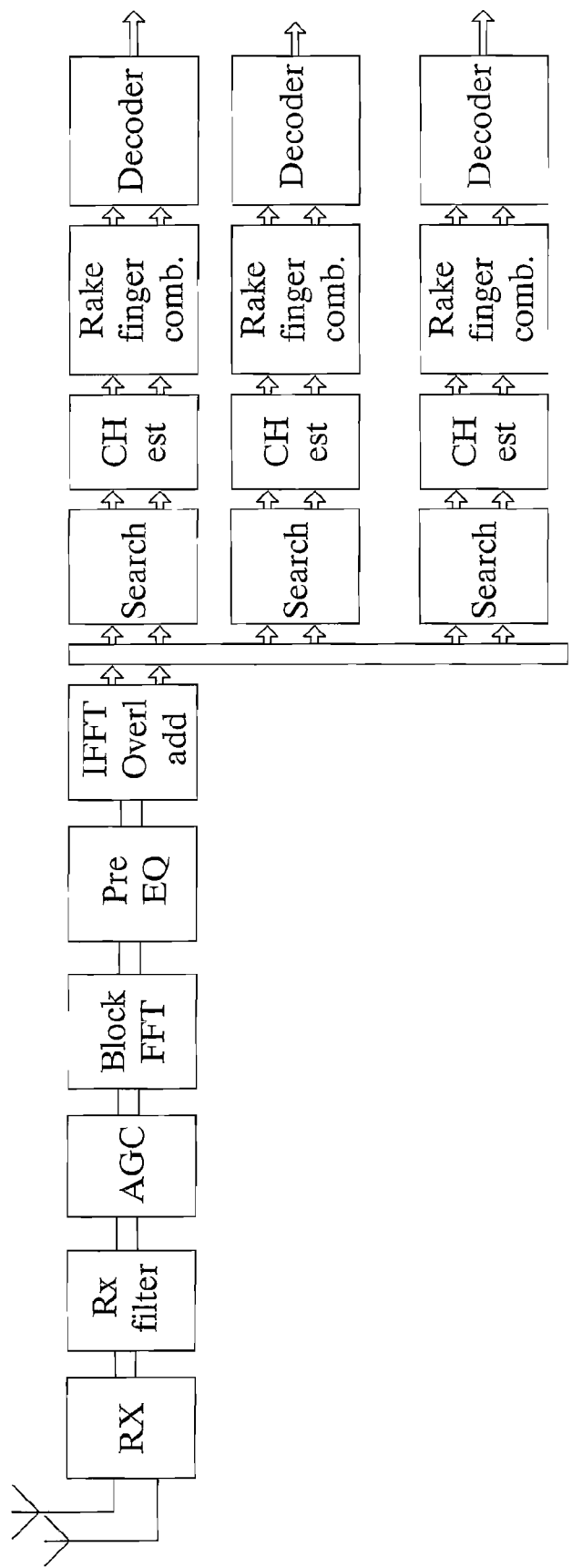
FIG. 3 is a schematic block diagram of an FDPE receiver.

A further example of an interference suppression capable receiver is the so called FDPE receiver. The FDPE receiver structure is depicted in FIG. 3. The blocks named "Block FFT", "Pre-EQ", and "IFFT Overlap-add" are added to the existing uplink WCDMA receiver structure without IS. The main advantages associated with this structure include the following:

The FDPE structure gives significant IS gains. It is not clear today if the gains are as large as those achieved with the G-rake+ structure.

The FDPE structure achieves IS for all users simultaneously, thereby reducing the computational complexity as compared to the G-rake+ structure that performs processing individually for all users.

Processing blocks are inserted in the uplink receiver structure that is already in place—thereby reducing development costs.

The fast Fourier transform (FFT) accelerator hardware developed for LTE can be reused, thereby creating further synergies for the new DUS HW of the RBS.

The FDPE receiver algorithm performs interference whitening in the frequency domain. To explain this in detail, time domain signal model in Equation 7 can be used:

$$v(t) = \sum_{l=0}^{L-1} h(l)z(t-l) + \eta_v(t). \tag{7}$$

Here v is the received (vector due to multiple antennas) signal, with chip sampling rate, h is the radio channel net response, z is the desired (transmitted) signal and $\eta_v$ denotes thermal noise and interference, t denotes discrete time.

Taking the Fourier transform, Equation 7 is translated into Equation 8:

$$V(m) = H(m)Z(m) + N(m), \tag{8}$$

where the capital letter quantities are the discrete Fourier transform of the corresponding quantities in Equation 7. Now a whitening filter can be applied in the frequency domain. It is well known that the filter that minimizes the mean square error (the MMSE solution) is given by Equation 9 below:

$$W_{MMSE}(m) = \left(\hat{R}_d(m)\right)^{-1} \hat{H}(m) = \left(\begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0(m)} & & & R_{N_r-1,N_r-1}(m) \end{bmatrix}\right)^{-1} \begin{bmatrix} \hat{H}_0(m) \\ \hat{H}_1(m) \\ \vdots \\ \hat{H}_{N_r-1}(m) \end{bmatrix} \tag{9}$$

where $\hat{R}_d(m)$ is an estimate of the covariance matrix of V(m).

This estimate can e.g. be obtained as an average over N different data blocks:

$$\hat{R}_d(m) = \frac{1}{N}\sum_{k=0}^{N-1} V_k(m)V_k^H(m). \tag{10}$$

Using a so-called Cholesky decomposition the covariance matrix between the antenna elements can be factored according to Equation 11:

$$L(m) \cdot L^H(m) = \hat{R}_d(m). \tag{11}$$

The idea behind the FDPE receiver is to exploit this factorization and write:

$$W_{MMSE}(m) = (L^H(m))^{-1}\hat{H}(m)) = W_{pre}(m)((L(m))^{-1}\hat{H}(m)) \tag{12}$$

so that the desired signal in the frequency domain becomes MMSE pre-equalized in the frequency domain, i.e. given by Equation 13 below:

$$Z_{pre}(m) = W_{pre}(m)V(m). \tag{13}$$

This is a user independent processing, which is the same for all users. Hence the wideband received signal is transformed to the frequency domain and the covariance matrix is computed and Cholesky factored, after which Equation 13 is computed. The signal is then transformed back to the time domain where it is further processed for each user. Note that the channels experienced by the RAKE receivers in this processing are obtained from the second factor of Equation 11. The FFT and IFFT blocks have low computational complexity and are preferably implemented in hardware.

Figure 4:
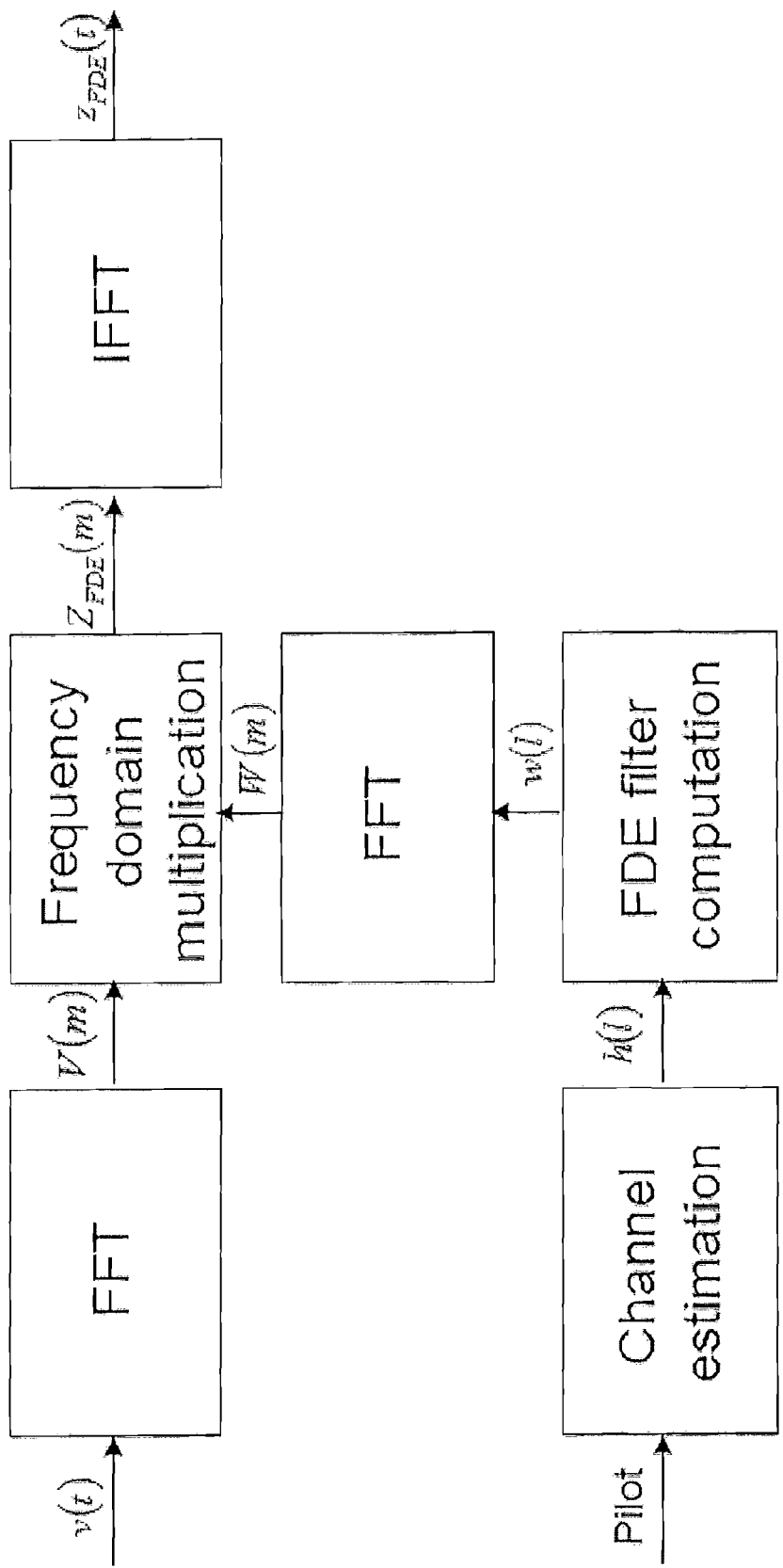
FIG. 4 is a schematic block diagram of an FDE receiver.

A third example of a linear receiver with interference suppression capabilities is the so called FDE receiver, see [4]. The FDE receiver structure is schematically depicted in FIG. 4. The user index u is omitted in the figure.

The FDE receiver algorithm performs equalization and interference suppression in the frequency domain. To explain this in detail, the following time domain signal model in Equation 14 can be used:

$$v_u(t) = \sum_{l=0}^{L-1} h_u(l)z(t-l) + i(t) + n^{thermal}(t), \tag{14}$$

$$u = 1, \ldots, U.$$

Here u denotes the user, $v_u$ is the received (vector due to multiple antennas) signal, $h_u$ is the radio channel net response, z is the desired (transmitted) signal, i(t) is the interference and $n^{thermal}(t)$ denotes thermal noise, t denotes discrete time.

Taking the Fourier transform, translates Equation (14) into Equation 15 below:

$$V_u(m) = H_u(m)Z_u(m) + I(m) + N^{thermal}(m), u=1,\ldots,U, \tag{15}$$

where the quantities are the discrete Fourier transform of the corresponding quantities in Equation (14).

Subsequently, MMSE equalization can be performed on $V_u(m)$. For this purpose, the channel is estimated using the pilot signal. FIG. 4 then indicates a first basic method to compute the MMSE filter for the FDE, using time domain calculations as described in [4].

However, rather than computing the filter coefficients in the time domain and then transforming to the frequency domain as in FIG. 4, the MMSE filter coefficients can be directly computed as [4], according to Equation 16 below:

$$W_u(m) = H_u^H(m)(H_u(m)H_u^H(m) + I(m)I^H(m) + (N^{thermal}(m))^H N^{thermal}(m))^{-1}, u=1,\ldots,U, \tag{16}$$

where the thermal noise power floor matrix estimate, can be obtained by any of the algorithms of [1], [2] or [3], and where $H_u(m)$ is the sampled channel frequency response vector. The use of Equation (16) is much less computationally complex than the method depicted in FIG. 4 and Equation 16 therefore represents the preferred embodiment for implementation of the FDE receiver.

Finally, the equalized signal is computed by a frequency domain multiplication according to Equation 17 below:

$$Z_{FDE,m}(m) = W_u(m)V_u(m), u=1,\ldots,U, \tag{17}$$

after which the inverse FFT is applied to get the signal $z_{FDE,u}(t)$. After this step processing proceeds as in a conventional WCDMA system.

Figure 5:
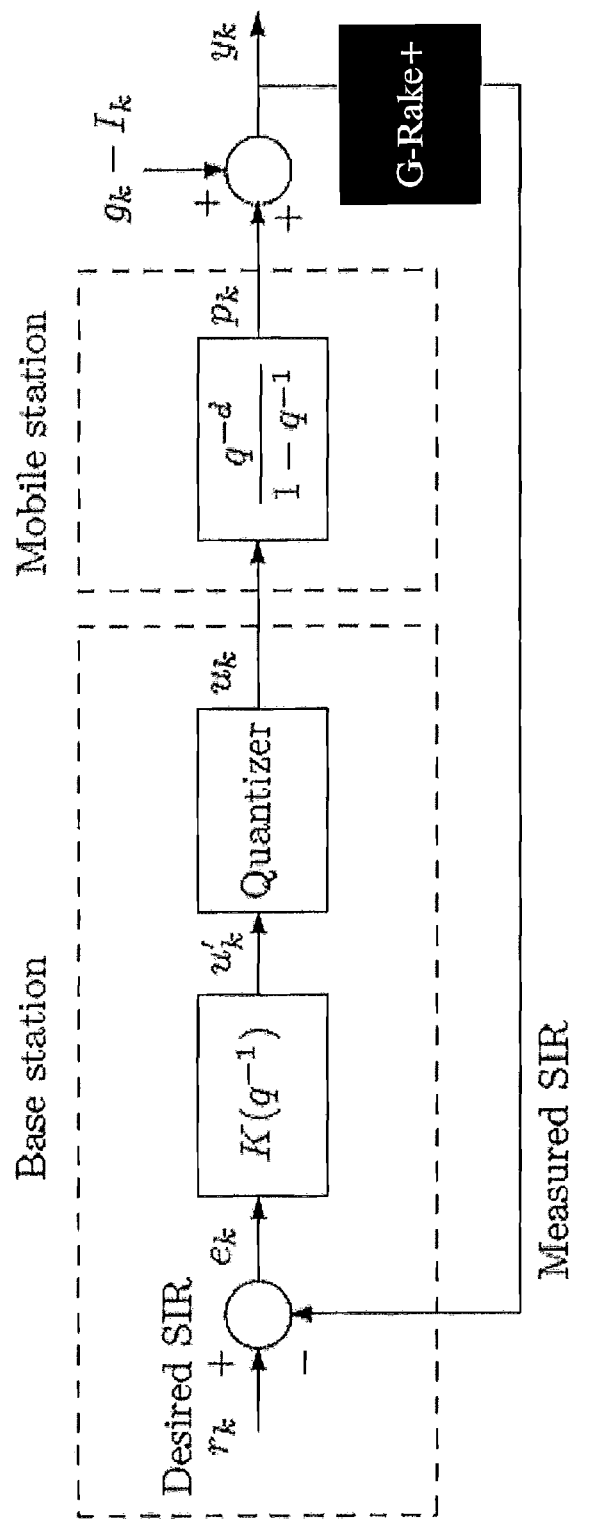
FIG. 5 is a schematic block diagram of the WCDMA power control loop with IS.

A simplified block diagram of the inner power control loop of a UE in the WCDMA uplink, with an IS receiver like G-rake+ in the system appears in FIG. 5.

Figure 2:
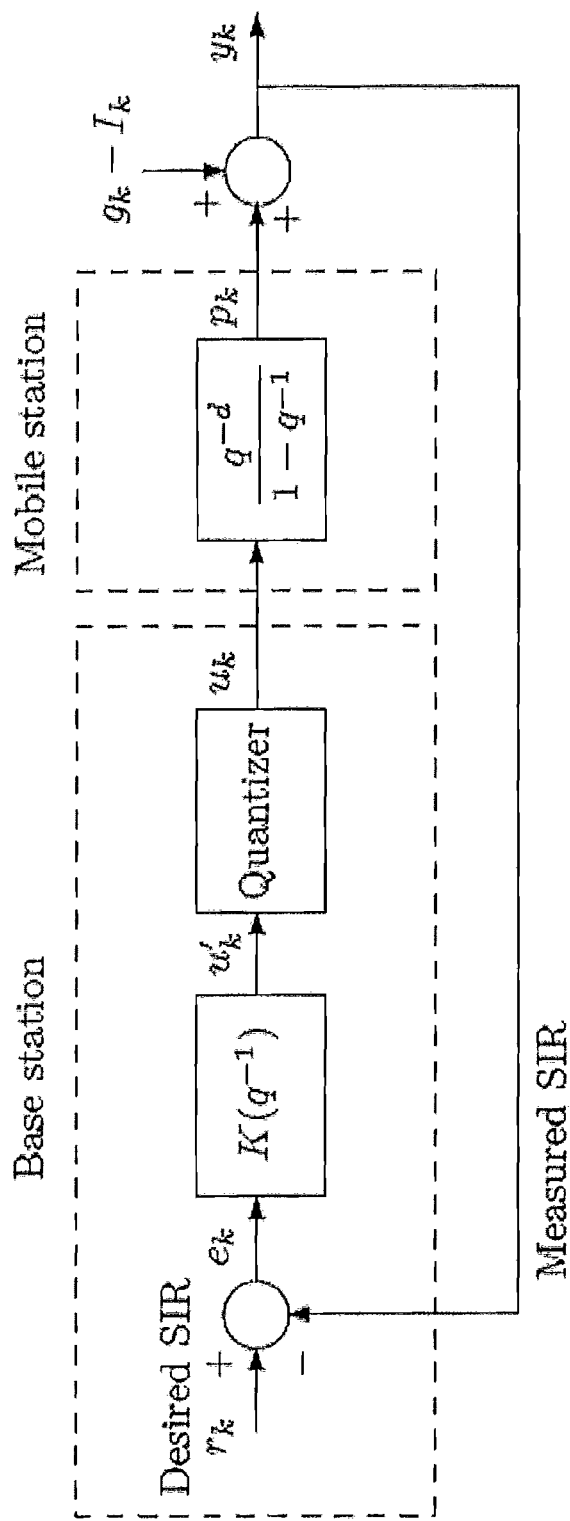
FIG. 2 is a schematic block diagram of the WCDMA power control loop without IS.

It can be noted that the loop appears to be identical to the one of FIG. 2. There is a major difference though: the Measured SIR signal point occurs after the IS receiver. As will be seen below this difference requires completely new concepts for the measurement of the UL WCDMA load.

The previously mentioned fast congestion control (FCC) in prior art is typically based on using consecutive estimate of the load e.g. rise over thermal (Appendix A, Equation A1) estimated at least as fast as the power control bandwidth of 1500 Hz. Functions of this load, e.g. the rate of change of RoT (Appendix A, Equation A1) and the absolute level of RoT (Appendix A, Equation A1), are then compared to corresponding thresholds and a power rush is declared if one or more of the functions exceed their corresponding thresholds.

A first problem with existing solutions is that there is no known way to measure or estimate the load after IS receivers. At the same time a second problem is that the introduction of IS receivers like the G-rake+ will make inner loop power control stability more difficult to maintain, since the load situation with IS processing will be more variable than without such processing. A third problem is that the power rushes that may occur are very fast phenomena, this being particularly troublesome since a fourth problem is that load measurements in prior art are only known at rates lower than the TTI (Transmission Time Interval) rate of WCDMA, i.e. 2 ms. A fifth problem is then that monitoring of the inner power control loop by fast congestion control schemes based on the load after IS processing at slot rate is not available. This is expected to limit the performance of IS receivers significantly.

Consequently, and as mentioned previously, the inventors have identified a need for providing load measurements that take interference suppression into account. In addition, the inventors have identified the need for a way to use the provided load measurements in order to improve the fast congestion control of IS capable WCDMA wireless communication systems.

Figure 6:
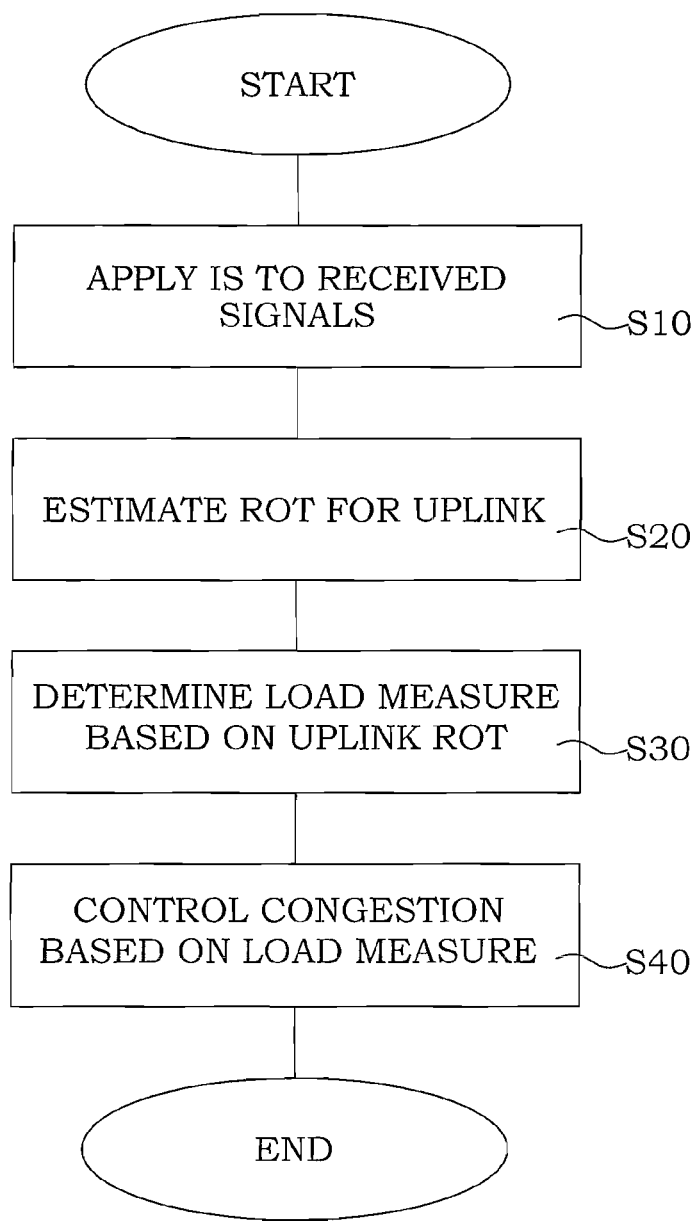
FIG. 6 is a schematic flow diagram of an embodiment of a method according to the present disclosure.

With reference to FIG. 6, an embodiment of a method of uplink congestion control in an interference suppression capable receiving node in a WCDMA wireless communication system will be described. The receiving node e.g. base station node, is typically associated with a plurality of users in the system, each user causing interference to the other users, which is suppressed by the node in question. Consequently, in an initial step S10, the node applies interference suppression techniques to signals received from the various users in the system in order to provide interference suppressed signals. Based on the interference suppressed received signals the node estimates, in step S20, a rise over thermal value for the uplink, after IS. Subsequently, a load measure for the uplink is determined, in step S30, based on the estimated rise over thermal value. Finally, the node controls, in step S40, the interference congestion of the uplink based on the determined load measure.

According to a specific embodiment, the interference suppression capable receiving node comprises a linear receiver e.g. a FDPE receiver.

A particular example of an embodiment including an FDPE receiver will be described below. The interested reader is guided to Annex C for a full derivation of the actual expressions.

In case of an FDPE receiver, the step of estimating S10 a rise over thermal RoT for the uplink is based on a pre-equalized wideband signal in the time domain, a wideband finite impulse response of the pre-equalizing filter in the time domain, and an estimated thermal noise floor of antenna branch a in the time domain, before pre-equalization. This can be achieved according to Equation 18 below:

$$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}, \quad (18)$$

where $RoT^{FDPE}$ is the rise over thermal for the uplink after interference suppression, $z_{pre}(t)$ is the pre-equalized wideband signal in the time domain, $w_{pre}(l)$ is the wideband finite impulse response of the pre-equalizing filter in the time domain, and $\hat{N}_a^{thermal}$ is the estimated thermal noise floor of antenna branch a in the time domain, before pre-equalization. The processing rate is the slot rate, i.e. the estimated quantities are useful for fast congestion control.

Figure 7:
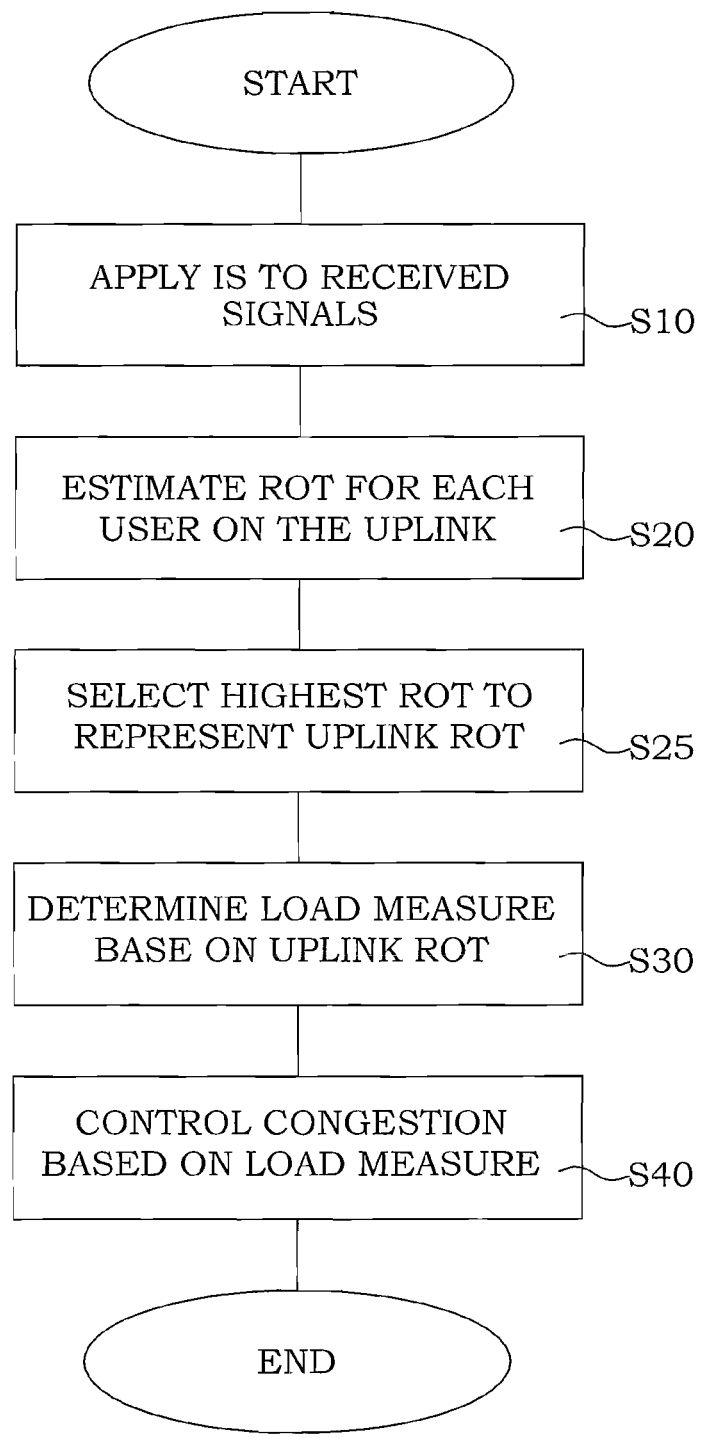
FIG. 7 is a schematic flow diagram of a further embodiment of a method according to the present disclosure.

According to the above-described first embodiment of the method, the rise over thermal value is estimated for the entire uplink. However, for some receivers, that will be described in more detail later on, the rise over thermal value is estimated per user and the user with the highest rise over thermal value is selected to represent the entire uplink. This further embodiment will be described below with reference to FIG. 7. As mentioned in relation to the previous embodiment, received signals in an interference suppression capable receiver are subjected to interference suppression S10 techniques in order to provide interference suppressed received signals. Subsequently, a respective rise over thermal value is estimated S20 for by each of the plurality of users associated with the receiving node. In a next step S25 a highest rise over thermal value of the respective estimated rise over thermal values is selected to represent the rise over thermal value for the uplink. Then a load measure for the uplink is determined S30 based on the selected highest rise over thermal value. Finally, the interference congestion is controlled S40 base on the determined load measure.

Preferably, the interference suppression capable receiving node comprises a linear receiver e.g. one of a G-rake+ receiver, or a FDE receiver.

An example of an embodiment utilizing a G-rake+ receiver for interference suppression according to embodiments of the present disclosure will be described below. The interested reader is guided to Annex D for a full derivation of the expression for RoT.

For the example, the rise over thermal RoT value for each respective user u is determined further based on an estimated noise floor for the uplink prior to interference suppression, and SINR for user u after interference suppression. This can be achieved according to Equation 19 below.

$$RoT_u^{G+} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right), \quad (19)$$

where $RoT_u^{G+}$ is the rise over thermal for user u after interference suppression, $S_u^{G+}$ is the signal power for user u, $K_u^{G+}$ is the scale factor for user u, $\hat{N}$ is the estimated noise floor prior to interference suppression, $SF_{u,DPCCH}$ is the spreading factor of the DPCCH channel for user u, $\beta_{u,effective}^2$ is the total effective beta factor squared (data power offset) for user u, $SINR_u^{G+}$ is the SINR for user u after interference suppression. Subsequently, the step of selecting (S25) a highest uplink rise over thermal value from the respective determined rise over thermal values is performed according to Equation 20 below:

$$u_{max} = \operatorname*{argmax}_{u}(RoT_u^{G+}),\quad (20)$$

where $u_{max}$ is the user with the highest estimated RoT value. In addition, the step of determining (S30) a load measure for the uplink is performed according to Equation 21 below:

$$\max(RoT_u^{G+}) = RoT_{u_{max}}^{G+}. \quad (21)$$

As can be seen above, the RoT experienced by each user after G-rake+ reception is individual. The UL RoT after IS processing is therefore obtained by selection of the worst (highest) RoT experienced by any associated user according to Equation 20 and Equation 21. The quantities appearing in Equation 19 are all defined in Annex D.

A further example of an embodiment where a rise over thermal for each of the plurality of users is estimated individually is the already mentioned FDE receiver. In this case, the step of estimating (S10) a respective rise over thermal RoT for each of the plurality of users is further based on the pre-equalized wideband signal for user u in the time domain, a wideband finite impulse response of the equalizing filter in the time domain for user u, and an estimated thermal noise floor of antenna branch a in the time domain, before equalization. This is further illustrated by Equation 22 below:

$$RoT_u^{FDE} = \frac{z_{FDE,u}^H(t) z_{FDE,u}(t)}{\left(\sum_{l=0}^{L-1} w_u^H(l) w_u(l)\right)\left(\sum_{a=1}^{A} \hat{N}_a^{thermal}\right)}, u=1,\ldots,U, \quad (22)$$

where $RoT_u^{FDE}$ is the rise over thermal for user u after interference suppression, $z_{FDE,u}(t)$ is the pre-equalized wideband signal for user u in the time domain, $w_u(l)$ is the wideband finite impulse response of the equalizing filter in the time domain for user u, and $\hat{N}_a^{thermal}$ is the estimated thermal noise floor of antenna branch a in the time domain, before pre-equalization.

Figure 8:
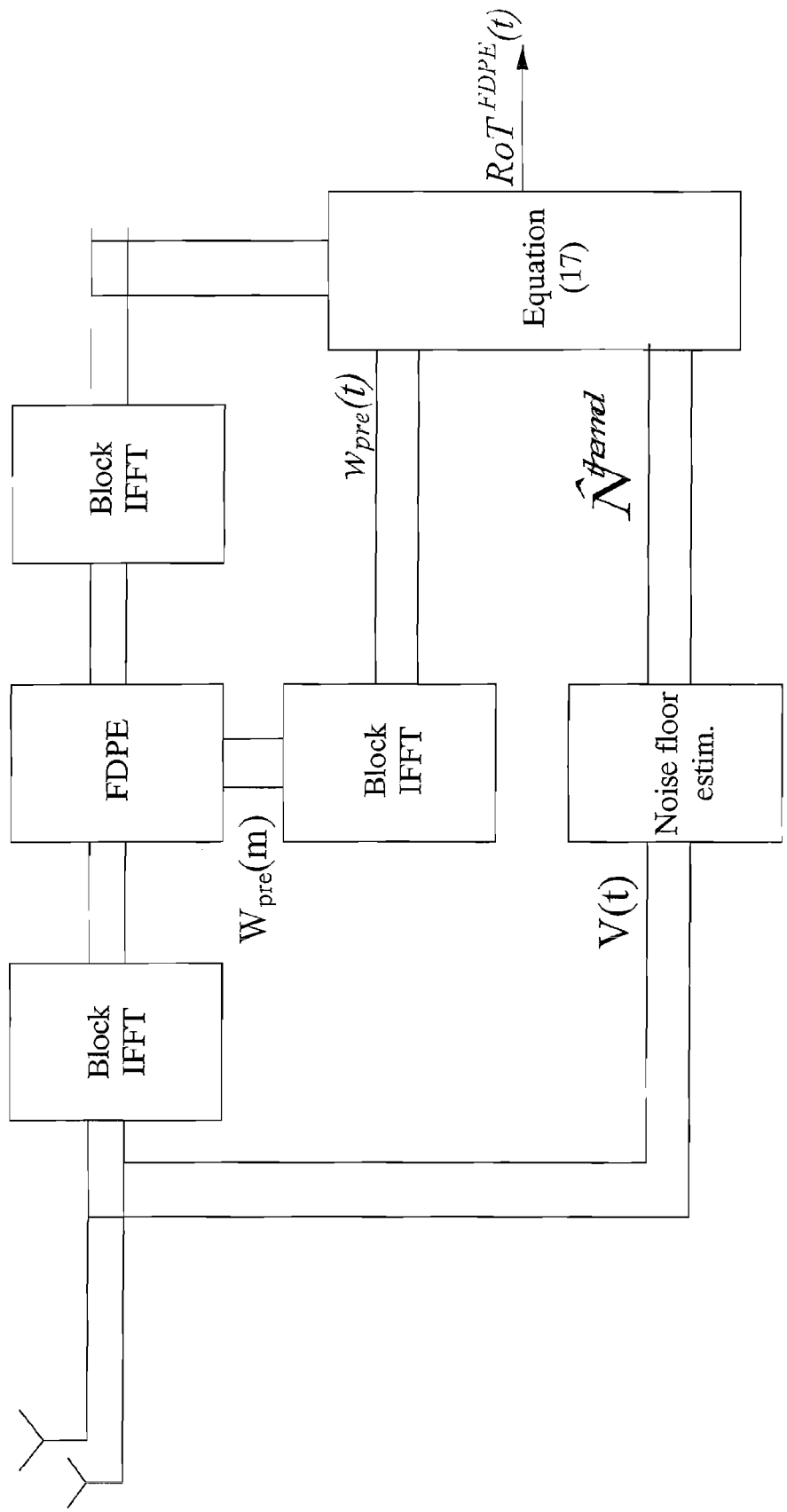
FIG. 8 is a schematic block diagram of an embodiment with an FDPE receiver of the present disclosure.

For the interested reader the complete derivation of the quantities appearing in Equation 22 are explained in Annex E together with FIG. 8 of this disclosure. The processing rate is the slot rate, i.e. the estimated quantity is useful for FCC.

Based on the above, embodiments of the step S30 of determining a load measure based on the rise over thermal values and the step of controlling interference congestion S40 will be described below.

Fast congestion control may use a variety of sources of information; the scope of this disclosure is however, limited to the use of the rise over thermal after IS processing. For convenience the "other" sources of information are collected in a vector α. In general, the FCC algorithm hence computes a vector test quantity according to Equation 23 below:

$$T_{FCC}(t) = f(g(RoT^{IS}(t), \ldots, RoT^{IS}(t-kT)), \alpha), \quad (23)$$

where $RoT^{IS}$ is any of the quantities of Equation 18, 21 or 22, g( ) is a vector function of this test quantity, k is a number (possibly infinity), T is the RoT estimation sampling period, and f(,) is the vector test quantity function which is of no further concern in this invention. Typical embodiments of g( ) include the absolute load level and the rate of change of the load level, given by Equations 24 and 25 below:

$$g_{level}(RoT^{IS}(t)) = RoT^{IS}(t), \quad (24)$$

$$g_{rate}(RoT^{IS}(t), RoT^{IS}(t-T)) = \frac{RoT^{IS}(t) - RoT^{IS}(t-T)}{T}. \quad (25)$$

Consequently, the determined load measure can comprise the absolute load level and/or the rate of change for the load level. Then the interference congestion is controlled by comparing the selected quantities e.g. absolute load level or rate of change of load level merged with other decision variables, to a threshold, and overrides inner loop power control, typically with down commands to a selected subset of all UEs of the UL of the cell, in case the selected threshold is exceeded. More advanced filtering of e.g. Equation 25 is also a distinct possibility.

In an example scenario, the comparison reveals that the absolute load level, as defined by Equation 24, exceeds a predetermined or set threshold. As a consequence the inner loop power control is overridden by a power down command to one or more UEs in the cell. In another example, the comparison reveals that the rate of change of the load level, as defined in Equation 25, exceeds a predetermined threshold. In other words, the load level is increasing too fast and there is a serious risk of a power surge. In that case the inner loop power control is overridden and a power down command is transmitted to one or more UEs.

Figure 9:
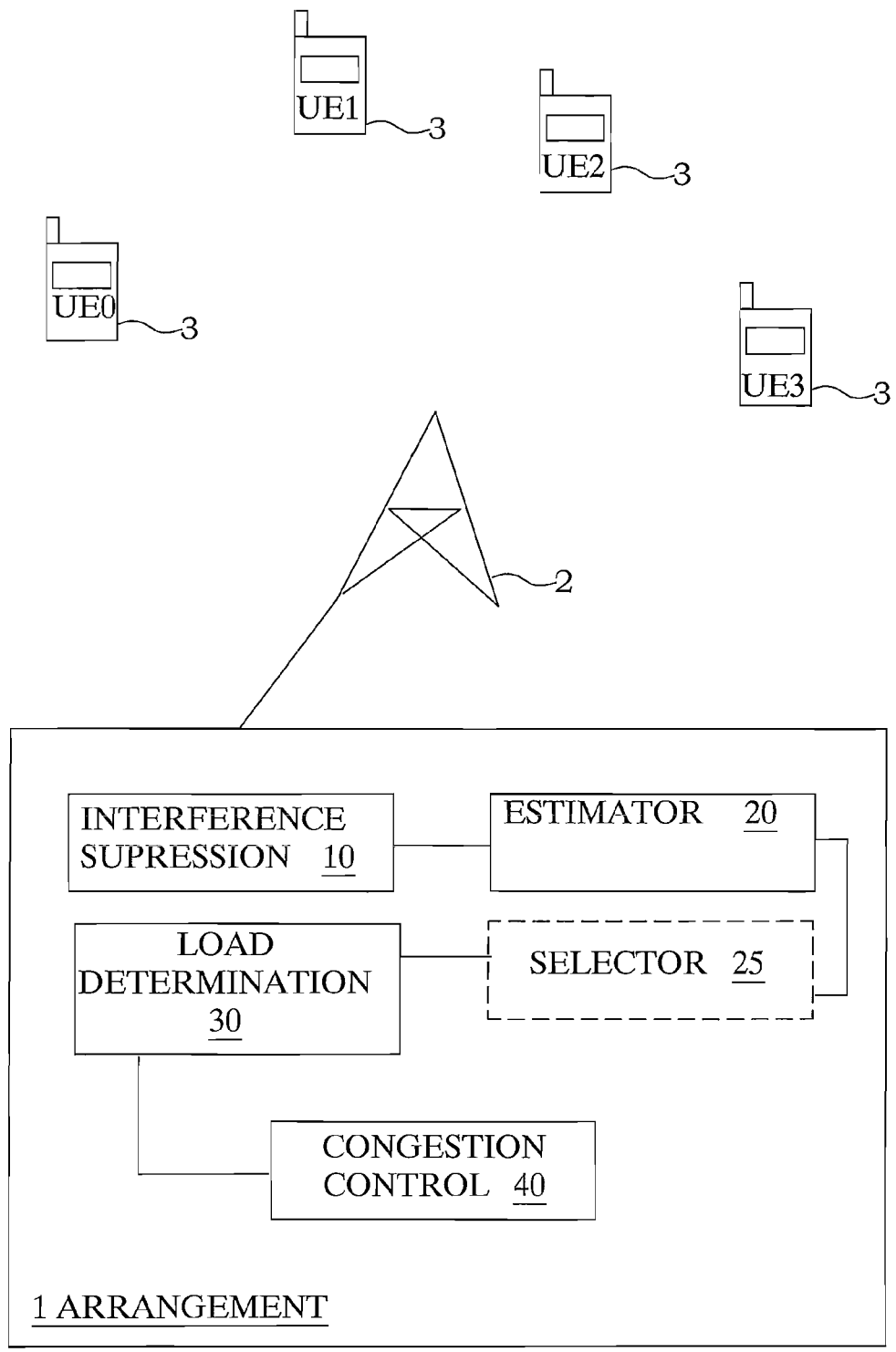
FIG. 9 is a schematic block diagram of an embodiment of an arrangement according to the present disclosure.

With reference to FIG. 9, an embodiment of an arrangement 1 suitable for providing the functionality of the previously described method will be described below.

Basically, an arrangement 1 for interference congestion control on an uplink in an interference suppression capable receiving node 2, e.g. radio base station, associated with a plurality of users 3, e.g. user equipment, in a wireless communication system comprises an interference suppression unit 10 configured to apply interference suppression techniques to received signals in the node, to provide interference suppressed received signals. Further, the arrangement 1 includes an estimating unit 20 configured to estimate a rise over thermal value for the uplink, based on the interference suppressed received signals, and a load determining unit 30 configured to determine a load measure for the uplink based on the estimated rise over thermal value. Finally, the arrangement includes a control unit 40 configured to control interference congestion on the uplink based on the determined load measure.

According to one particular embodiment, the arrangement comprises a linear receiver, e.g. a FDPE receiver.

According to a further embodiment, and as indicated by the optional dotted boxes in FIG. 9, the estimating unit 20 is configured to estimate a respective rise over thermal value for each of the plurality of users on said uplink. In addition, the arrangement 1 includes a selecting unit 25 configured to select a highest rise over thermal value of the respective estimated rise over thermal values to represent the rise over thermal value for the uplink. The determining unit 30 is then further configured to determine a load measure for the uplink based on the selected highest rise over thermal value.

According to a further particular embodiment, the arrangement 1 comprises a linear receiver e.g. a G-rake+ receiver or a FDE receiver.

In a further embodiment of the arrangement 1, the load determining unit 30 is configured to determine an absolute load measure according to Equation 24, and the control unit 40 is configured to control interference by overriding an inner power control loop in case the determined absolute load measure exceeds a set threshold value. The control comprises issuing a power down command to one or more selected UEs. According to yet a further embodiment, the load determining unit 30 is configured to determine a rate of change of a load measure, and the control unit 40 is configured to control the load if the rate of change of the load measure exceeds a preset rate of change, thus indicating that a power surge is occurring or is at risk of occurring. In this case, a power down command is also issued, which overrides the inner power control loop, thus preventing or at least limiting an impending power rush.

Preferably, the above described arrangement is provided in a radio base station node in a WCDMA wireless communication system The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 10:
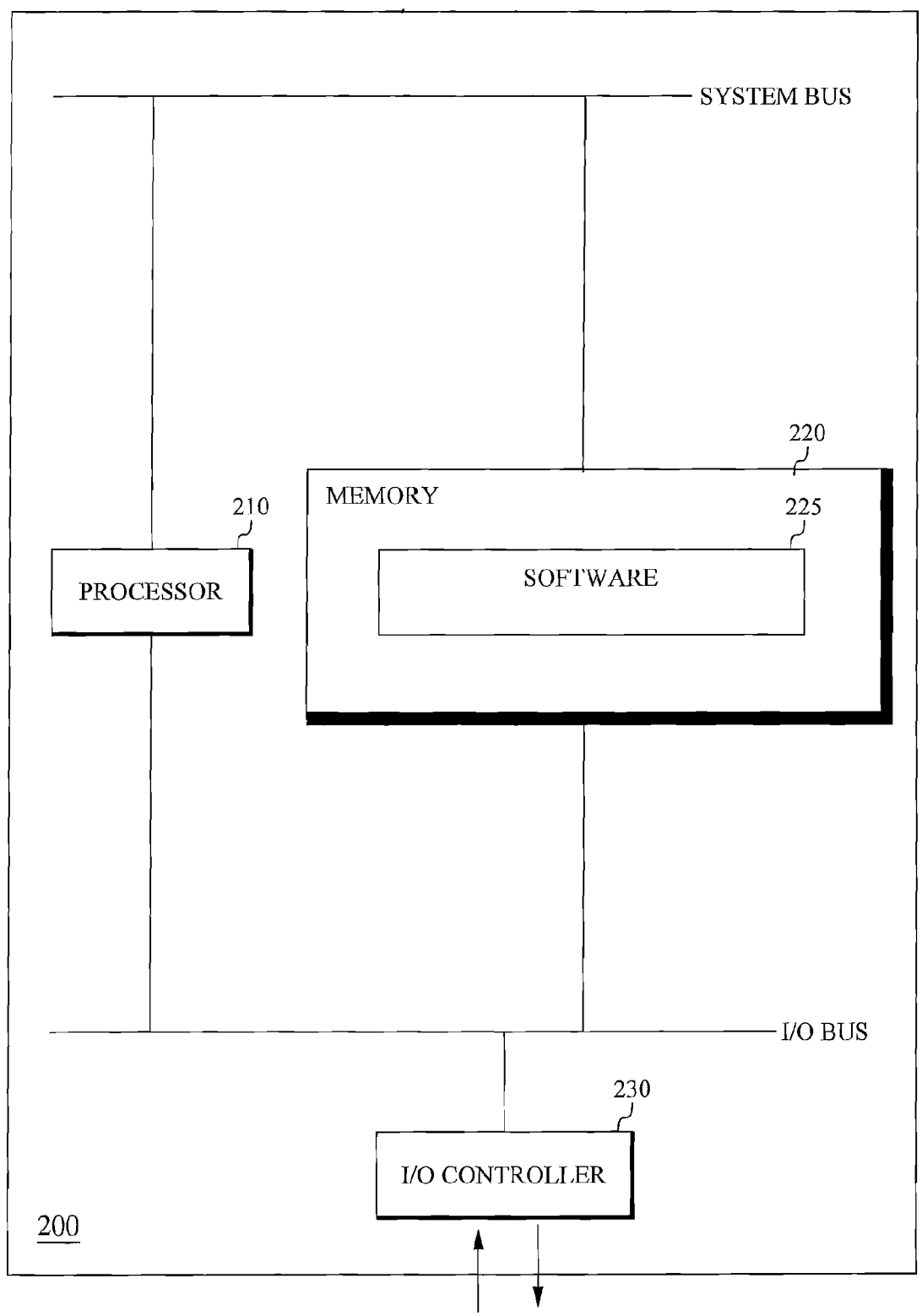
FIG. 10 is a schematic illustration of a computer implementation of the present disclosure.

In the following, an example of a computer-implementation will be described with reference to FIG. 10. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

A main advantage of several embodiments of the invention is that it allows load in terms of the rise over thermal to be measured after IS processing, and further allows the WCDMA UL stability to be monitored by new fast congestion control algorithms, receptive to the load situation after IS processing, in terms of the rise over thermal. The WCDMA UL stability is thereby improved. Further, by utilizing the teachings of the present disclosure it is possible to schedule user more aggressively since the risk of power surges is effectively counteracted by the disclosure.

REFERENCES

[1] T. Wigren and P. Hellqvist, "Estimation of uplink WCDMA load in a single RBS", *Proc. IEEE VTC*-2007 *Fall*, Baltimore, Md., USA, Oct. 1-3, 2007.

[2] T. Wigren, "Soft uplink load estimation in WCDMA", *IEEE Trans Veh. Tech.*, March, 2009.

[3] T. Wigren, "Recursive noise floor estimation in WCDMA", *IEEE Trans. Veh. Tech.*, vol. 59, no. 5, pp. 2615-2620, 2010.

[4] E. Dahlman, S. Parkvall, J. Sköld and P. Beming, "3G Evolution—HSPA and LTE for mobile broadband—section 5.1" 2:nd edition, Academic Press, 2008.

Annex A

Load and Rot Estimation without IC/IS

It is e.g. shown in prior art that without IC/IS, the load at the antenna connector is given by the noise rise, or rise over thermal, RoT(t), defined by $$RoT(t) = \frac{RTWP(t)}{N(t)} \tag{A1}$$

where N(t) is the thermal noise level as measured at the antenna connector. It remains to define what is meant with RTWP(t). This relative measure is unaffected of any de-spreading applied. The definition used here is simply the total wideband power $$RTWP(t) = \sum_{k=1}^{K} P_k(t) + I^N(t) + N(t) \tag{A2}$$

also measured at the antenna connector. Here $I^N(t)$ denotes the power as received from neighbor cells $^N$ of the WCDMA system. As will be seen below, the major difficulty of any RoT estimation algorithm is to separate the thermal noise power from the interference from neighbor cells.

Another specific problem that needs to be addressed is that the signal reference points are, by definition at the antenna connectors. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (A2) are equally affected by the scale factor error so when (A1) is calculated, the scale factor error is cancelled as $$RoT^{DigitalReceiver}(t) = \frac{RTWP^{DigitalReceiver}(t)}{N^{DigitalReceiver}(t)} = \frac{\gamma(t)RTWP^{Antenna}(t)}{\gamma(t)N^{Antenna}(t)} = RoT^{Antenna}(t) \tag{A3}$$

In order to understand the fundamental problem of neighbor cell interference when performing load estimation, note that $$I^N(t)+N(t)=E[I^N(t)]+E[N(t)]+\Delta I^N(t)+\Delta N(t) \tag{A4}$$

where E[ ] denotes statistical expectation and where $\Delta$ denotes the variation around the mean. The fundamental problem can now be clearly seen. Since there are no measurements available in the radio base station node that are related to the neighbor cell interference, a linear filtering operation can at best estimate the sum $E[I^N(t)]+E[N(t)]$, cf. [1]. This estimate cannot be used to deduce the value of $E[N(t)]$. The situation is the same as when the sum of two numbers is available. Then there is no way to figure out the values of the individual numbers. This issue is analyzed rigorously for the RoT estimation problem in [2] where it is proved that the noise power floor is not mathematically observable.

RoT Estimation Algorithms in Prior Art

Sliding Window Algorithm

The RoT estimation algorithm currently in use is depicted in FIG. 1. It is described in detail in [1]. The algorithm estimates the RoT, as given by (A1). The main problem solved by the estimation algorithm is the accurate estimation of the thermal noise floor N(t). Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods (disregarding the small temperature drift).

Recursive Algorithm

The sliding window algorithm of the above section has the disadvantage of requiring a large amount of storage memory. This becomes particularly troublesome in case a large number of instances of the algorithm is needed, as may be the case when IS is introduced in the uplink.

To reduce the memory consumption a recursive algorithm has been disclosed previously. That algorithm reduces the memory requirements of the sliding window scheme discussed above at least by a factor of 100.

The invention disclosed here is applicable both to the sliding window RoT estimation algorithm and the recursive algorithm.

Annex B

WCDMA Inner Loop Power Control

Without IS—Today's System

A simplified block diagram of one embodiment of the inner power control loop of one UE in the WCDMA uplink appears in FIG. 2.

Note that the quantities are expressed in a logarithmic scale ([dB]). Here $q^{-1}$ denotes the backward shift operator, k discrete time ([slot, 667 micro seconds]), $r_k$ the target SIR, $e_k$ the SIR error, $K(q^{-1})$ the controller (a constant in the current implementation), $u_k$ the control signal, $u_k$ the one-bit quantized transmitted control signal, d the delay in slots, $p_k$ the transmit power, $g_k$ the uplink channel gain, $I_k$ the interference and $y_k$ the measured SIR. The inner loop power controller operates at a frequency of 1500 Hz.

Without IS, the measured SIR signal point of FIG. 2 occurs after the conventional RAKE receiver.

Annex C

FDPE RoT

The Signal After FDPE

Using Equations (8) and (12) results in Equation C1 below $$Z_{pre}(m) = W_{pre}(m)H(m)Z(m) + W_{pre}(m)I(m) + W_{pre}(m)N^{thermal}(m) \quad (C1)$$

Here $Z_{pre}(m)$ denotes the pre-equalized wideband signal in the frequency domain, $W_{pre}(m)$ denotes the wideband pre-equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. The equation (C1) is readily transformed to the time domain with an inverse discrete Fourier transformation, rendering $$z_{pre}(t) = (w_{pre}h)(t)*z(t) + w_{pre}(t)*i(t) + w_{pre}(t)*n^{thermal}(t) \quad (C2)$$

where the star denotes (multi-dimensional) convolution $z_{pre}(t)$ denotes the pre-equalized wideband signal in the time domain, $w_{pre}(t)$ denotes the wideband finite impulse response of the pre-equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain. It is important to understand that all signal quantities are here given before the pre-equalization step.

Measuring Load After FDPE

Load Definition

To obtain a measure of the load after FDPE interference whitening the RoT after this step is considered. This is in fact more appealing than for the G-rake+ receiver in that the whole uplink load is addressed at the same time. The RoT measure after FDPE processing is given by Equation C3 below $$RoT^{FDPE}(t) = \frac{z_{pre}^H(t)z_{pre}(t)}{E[(w_{pre}(t)*n^{thermal}(t))^H(w_{pre}(t)*n^{thermal}(t))]} \quad (C3)$$

Computation of the Numerator of (C3)

The numerator of (C3) is straightforward to compute. Noting that the time scale for the RoT measurement in WCDMA is normally a transmission time interval (TTI), it follows that the numerator of (C3) can be computed e.g. by an average of time samples over the TTI of interest (typically 2 ms or 10 ms).

Computation of the Denominator of (C3)

The computation of the denominator of (C3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_{pre}(t)*n^{thermal}(t))^H(w_{pre}(t)*n^{thermal}(t))\right] = \quad (C4)$$

$$E\left[\sum_{l_1=0}^{L-1}(n^{thermal}(t-l_1))^H w_{pre}^H(l_1)\sum_{l_2=0}^{L-1}w_{pre}(l_2)n^{thermal}(t-l_2)\right] =$$

$$E\left[\left(\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right)\right] =$$

$$E\left[\sum_{l_1=0}^{L-1}\sum_{l_2=0}^{L-1}w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1}w_{pre}^H(l_1)w_{pre}(l_2)E\left[(n^{thermal}(t-l_1))^H n^{thermal}(t-l_2)\right]$$

$$\sum_{l_1=0}^{L-1}\sum_{l_2=0}^{L-1}w_{pre}^H(l_1)w_{pre}(l_2)\delta_{l_1,l_2}\sum_{a=1}^{A}\hat{N}_a^{thermal} =$$

-continued $$\left(\sum_{l=0}^{L-1} w_{pre}^H(l) w_{pre}(l)\right)\left(\sum_{a=1}^{A} \hat{N}_a^{thermal}\right)$$

In (C4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

Load Estimate and Block Diagram

Combining (C3) and (C4) results in Equation C5

$$RoT^{FDPE} = \frac{z_{pre}^H(t) z_{pre}(t)}{\left(\sum_{l=0}^{L-1} w_{pre}^H(l) w_{pre}(l)\right)\left(\sum_{a=1}^{A} \hat{N}_a^{thermal}\right)} \quad (C5)$$

The quantities above should be computed as averages or estimates over a time interval where the whitening filter of the FDOE remains constant. The result is intuitive. Since the total received wideband power is summed over all antenna branches, so is the thermal noise power floor. The RoT after FDPE is also scaled with the power of the pre-whitening filter. A block diagram of the load estimation solution is depicted in FIG. 12. Only the FDPE blocks are shown there. As can be seen, the main advantage of the FDPE is that the processing is user independent.

Annex D

G-RAKE+

Measurement of Load after is in G-Rake+ and Chip Equalizers

To see how load can be estimated taking account of the G-rake+ IS gain, the powers after weight combining are studied at sufficient statistics level. First, it is assumed that the received signal of user u on code $k \in \Omega_u$ is $$y_{u,k} = h_u s_{u,k} + I_{u,k} + N_{u,k}, u=1, \ldots, U, k=1, \ldots, K \quad (D1)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. G-rake+ then performs weight combining to get the sufficient statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k},$$
$$u=1, \ldots, U, k=1, \ldots, K \quad (D2)$$

$$\hat{R}_u \hat{w}_u = \hat{h}_u, u=1, \ldots, U \quad (D3)$$

Here $\hat{w}_u$ are the combining weights of G-rake+, whereas the estimated covariance matrix that models the interference for computation of the combining weights for the users u is given by $\hat{R}_u$. Equations (D2) and (D3) have two main implications; one indicating how power measurements can be done and one indicating the scale factor problem which is addressed below.

Using equation (D2) it can be seen that the effect of the G-rake+ weight combining is the same as if an artificial received signal $z_{u,k}^{G+}$ would be processed. Since these signals obviously reflect the weight combining and thereby the IS gains of the G-rake+ receiver, $z_{u,k}^{G+}$, u=1, ..., U, k=1, ..., K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, ..., U, k=1, ..., K, in order to reuse the load concept applied without IS.

It is not clear if the proposed approach to reuse the load concept applied without IS is precise or optimal. At the present time it is the only approach available.

User Powers Associated with the G-Rake+ Sufficient Statistics

Squaring (D2) and assuming a low degree of correlation between its three terms, leads to $$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} \hat{w}_u \equiv S_{u,k}^{G+} + I_{u,k}^{G+} + N_{u,k}^{G+}, u=1, \ldots, U, k= 1, \ldots, K \quad (D4)$$

The rise over thermal, as seen by user u is now determined by Equation A1 (see Appendix A), by definition $$RoT_u^{G+} \equiv \frac{S_u^{G+} + I_u^{G+} + N_u^{G+}}{N_u^{G+}} \quad (D5)$$

$$S_u^{G+} = \sum_{k \in \Omega_u} S_{u,k}^{G+} \quad (D6)$$

$$I_u^{G+} = \sum_k I_{u,k}^{G+} \quad (D7)$$

$$N_u^{G+} = \sum_k N_{u,k}^{G+} \quad (D8)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (C4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (D4)-(D8).

Computation of $S_u^{G+}$

The signal power is computed directly from (D6). Using (D4) and (D6) then results in $$S_u^{G+} = \sum_{k \in \Omega_u} S_{u,k}^{G+} = \hat{w}_u^H \hat{h}_u \hat{h}_u^H \hat{w}_u \sum_{k \in \Omega_u} |s_{u,k}|^2 = \hat{w}_u^H \hat{h}_u \hat{h}_u^H \hat{w}_u \hat{E}_{s,u} = \left|\hat{w}_u^H \hat{h}_u\right|^2 \hat{E}_{s,u}, \quad (D9)$$

$$u = 1, \ldots, U$$

Note that computation of the signal energy $\hat{E}_{s,u}$ is quite intricate, including e.g. the involved beta factors.

Computation of $N_u^{G+}$

White Noise Power Floor

The idea here is to rely on the baseline thermal noise power floor estimation algorithm to estimate the thermal noise power floor before any G-rake+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before G-rake+ processing, e.g. with the baseline noise floor estimator, the following quantity is estimated $$\hat{N} = \frac{1}{M}\sum_{m=1}^{M}\sum_{k=1}^{K}(N_{u,k}^m)^H N_{u,k}^m \underset{M\to\infty}{\to} KE[(N_{u,k})^H N_{u,k}] = \quad (D10)$$

$$KP_{N_{u,k}} = K\frac{1}{K}P_N = N_0$$

where $N_0$ is the thermal noise power floor and where m is the sample summation index. The power at the sufficient statistics signal processing point is however described by Equation D11

$$\hat{N}^{G+} = \quad (D11)$$

$$\frac{1}{M}\sum_{m=1}^{M}\sum_{k=1}^{K}(\hat{w}_u^H N_{u,k}^m)^H \hat{w}_u^H N_{u,k}^m = \frac{1}{M}\sum_{m=1}^{M}\sum_{k=1}^{K}tr((\hat{w}_u^H N_{u,k}^m)^H \hat{w}_u^H N_{u,k}^m) =$$

$$\frac{1}{M}\sum_{m=1}^{M}\sum_{k=1}^{K}tr(\hat{w}_u^H N_{u,k}^m (\hat{w}_u^H N_{u,k}^m)^H) =$$

$$\frac{1}{M}\sum_{m=1}^{M}\sum_{k=1}^{K}tr(\hat{w}_u^H N_{u,k}^m (N_{u,k}^m)^H \hat{w}_u) =$$

$$tr\left(\sum_{k=1}^{K}\hat{w}_u^H\left(\frac{1}{M}\sum_{m=1}^{M}N_{u,k}^m(N_{u,k}^m)^H\right)\hat{w}_u\right)_{M\to\infty}$$

$$tr(K\hat{w}_u^H E[N_{u,k}(N_{u,k})^H]\hat{w}_u) =$$
$$tr(K\hat{w}_u^H(N_0/K)I\hat{w}_u) = \hat{w}_u^H \hat{w}_u N_0 = \hat{w}_u^H \hat{w}_u \hat{N}.$$

The conclusion is that the thermal noise floor at the sufficient statistics signal point can be obtained from the noise floor estimate before G-rake+ processing, by a multiplication with the scale factor $$\kappa_u^{G+}=(\hat{w}_u)^H \hat{w}_u, u=1,\ldots,U \quad (D12)$$

This gives $$N_u^{G+}=\kappa_u^{G+}\hat{N},\ldots,U \quad (D13)$$

The computation of the scale factor requires an additional inner product for each user.

Colored Noise Power Floor

This subsection discusses the case where the result of (D10) is replaced by the more general assumption $$\frac{1}{M}\sum_{m=1}^{M}\sum_{k=1}^{K}N_{u,k}^m(N_{u,k}^m)^H \underset{M\to\infty}{\to} KE[N_{u,k}(N_{u,k})^H] = K\frac{N_0}{K}R_N = N_0 R_N \quad (D14)$$

i.e. the case when sampling is fast enough to reflect the shape of the uplink spectrum. In this case, it follows that (D10) is transformed to $$\hat{N} = \frac{1}{M}\sum_{m=1}^{M}\sum_{k=1}^{K}(N_{u,k}^m)^H N_{u,k}^m \underset{M\to\infty}{\to} KE[(N_{u,k})^H N_{u,k}] = \quad (D15)$$

$$Ktr(E[N_{u,k}(N_{u,k})^H]) = N_0 tr(R_N)$$

Furthermore, (D11) is transformed into $$\hat{N}^{G+}=N_0 tr(\hat{w}_u^H R_N \hat{w}_u) \quad (D16)$$

The end result in this case is the scale factor $$\kappa_u^{G+} = \frac{tr(\hat{w}_u^H R_N \hat{w}_u)}{tr(R_N)} \quad (D17)$$

Computation of $I_u^{G+}$ Using Available SINRs

The code power to interference ratio is, $$(C/I)_u^{G+} = \frac{S_u^{G+}}{I_u^{G+} + N_u^{G+}}, \quad (D18)$$

$$u = 1, \ldots, U$$

It can be noted that in (D18), all quantities except $I_u^{G+}$ have been computed, see (D11) and (D13). Using these quantities, (D18) can be solved for $I_u^{G+}$, giving $$I_u^{G+} = \frac{S_u^{G+}}{(C/I)_u^{G+}} - \kappa_u^{G+}\hat{N}, \quad (D19)$$

$$u = 1, \ldots, U$$

The quantity $(C/I)_u^{G+}$ can be directly related to SINR. This is performed as $$(C/I)_u^{G+} = \frac{(\beta_{u,DPCCH}^2 + \beta_{u,EDPCCH}^2 + n_{u,codes}\beta_{u,EDPDCH}^2)}{\beta_{u,DPCCH}^2 SF_{u,DPCCH}} SINR_u^{G+} = \quad (D20)$$

$$\frac{\beta_{u,effective}^2}{SF_{u,DPCCH}} SINR_u^{G+}$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N} \quad (D21)$$

Computation of $RoT_u^{G+}$

When Equations (D9), (D13), and (D21) are inserted in (D5), the end result becomes $$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,DPCCH}}{\beta_{u,effective}^2} \frac{1}{SINR_u^{G+}}\right), \quad (D22)$$

$$u = 1, \ldots, U$$

These measures, for each user, are then combined into an uplink measure as outlined below. Note that (D22) provides some interesting insights. When SINR is high then the RoT for the user is essentially determined by the remaining own power of the user—the RoT then increases when the SINR gets worse.

Uplink Load Measure for G-Rake+

It is clear that that the user that sees the maximum total load is the one worst off in terms of coverage and stability. That user is hence used to address the load of the UL of the cell. The worst-case load is defined by the equations $$u_{max} = \underset{u}{\mathrm{argmax}}(RoT_u^{G+}) \tag{D23}$$

$$\max(RoT_u^{G+}) = RoT_{u_{max}}^{G+} \tag{D24}$$

Annex E

FDE

The Signal after FDE

Using Equation (15) and (17) results in the following equation, where u denotes user U $$Z_{FDE,u}(m)W_u(m)H_u(m)Z(m)+W_u(m)I(m)+W_u(m)N^{ther\text{-}mal}(m) \tag{E1}$$

Here $Z_{FDE,u}(m)$ denotes the pre-equalized wideband signal in the frequency domain, $W_u(m)$ denotes the wideband MMSE equalizing filter in the frequency domain, $H_u(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. All signals are vector valued. The equation (E1) is readily transformed to the time domain with an inverse discrete Fourier transformation, rendering $$Z_{FDE,u}(t)=(w_u h_u)(t)*z(t)+w_u(t)*i(t)+w_u(t)*n^{thermal}(t) \tag{E2}$$

where the star denotes (multi-dimensional) convolution, $z_{pre,u}(t)$ denotes the equalized wideband signal in the time domain, $w_u(t)$ denotes the wideband finite impulse response of the equalizing filter in the time domain, $h_u(t)$ denotes the wideband finite impulse response net channel response in the time domain, $z(t)$ denotes the wideband transmitted signal in the time domain, $i(t)$ denotes the wideband neighbor cell interference in the time domain and $n^{thermal}(t)$ denotes the wideband thermal noise floor signal in the time domain.

Measuring Load after FDE

Load Definition

To obtain a measure of the load after the FDE interference whitening, the RoT after this step is considered. The RoT measure after FDE processing is given by $$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \tag{E3}$$

Computation of the Numerator of (E3)

The numerator of (E3) is straightforward to compute. Noting that the time scale for the RoT measurement in WCDMA is normally a transmission time interval (TTI), it follows that the numerator of (E3) can be computed e.g. by an average of time samples over the TTI of interest (typically 2 ms or 10 ms).

Computation of the Denominator of (E3)

The computation of the denominator of (E3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_u(t)*n^{thermal}(t))^H(w_u(t)*n^{thermal}(t))\right] = \tag{E4}$$

$$E\left[\sum_{l_1=0}^{L-1}(n^{thermal}(t-l_1))^H w_u^H(l_1)\sum_{l_2=0}^{L-1}w_u(l_2)n^{thermal}(t-l_2)\right] =$$

$$E\left[\left(\sum_{l_1=0}^{L-1}\sum_{l_2=0}^{L-1}(n^{thermal}(t-l_1))^H w_u^H(l_1)w_u(l_2)n^{thermal}(t-l_2)\right)\right] =$$

$$E\left[\sum_{l_1=0}^{L-1}\sum_{l_2=0}^{L-1}w_u^H(l_1)w_u(l_2)(n^{thermal}(t-l_1))^H n^{thermal}(t-l_2)\right] =$$

$$\sum_{l_1=0}^{L-1}\sum_{l_2=0}^{L-1}w_u^H(l_1)w_u(l_2)E\left[(n^{thermal}(t-l_1))^H n^{thermal}(t-l_2)\right]$$

$$\sum_{l_1=0}^{L-1}\sum_{l_2=0}^{L-1}w_u^H(l_1)w_u(l_2)\delta_{l_1,l_2}\sum_{a=1}^{A}\hat{N}_a^{theraml} =$$

$$\left(\sum_{l=0}^{L-1}w_u^H(l)w_u(l)\right)\left(\sum_{a=1}^{A}\hat{N}_a^{thermal}\right)$$

In (E4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

Load Estimate

Combining (E3) and (E4) results in $$RoT_u^{FDE} = \frac{z_{FDE,u}^H(t)z_{FDE,u}(t)}{\left(\sum_{l=0}^{L-1}w_u^H(l)w_u(l)\right)\left(\sum_{a=1}^{A}\hat{N}_a^{thermal}\right)}, \tag{E5}$$

$$u = 1, \ldots, U$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

Combination of Users

The above discussion has focused on a single user. However, what is interesting is a load measure for the complete uplink. Since it is likely that it is the user that experiences the highest load that limits the uplink, the uplink load is defined to be $$RoT = \max_{u} RoT_u^{FDE} \tag{E6}$$

where $RoT_u^{FDE}$ is the noise rise of user u.

What is claimed is:

1. A method of uplink interference congestion control in an interference suppression capable receiving node associated with a plurality of users of an uplink in a wireless communication system, the method comprising:

applying interference suppression to each of a plurality of received user signals in said node, to suppress other-user, same-band, interference to each received user signal, thereby providing interference suppressed received signals;

estimating a rise over thermal value for said uplink, based on said interference suppressed received signals and an estimate of thermal noise;

determining a load measure for the uplink based on said estimated rise over thermal value; and controlling interference congestion on said uplink based on said determined load measure.

2. The method according to claim 1, wherein said step of estimating a rise over thermal value comprises estimating a respective rise over thermal value for each of said plurality of users on said uplink;

said method further comprises the step of selecting a highest rise over thermal value of said respective estimated rise over thermal values to represent the rise over thermal value for said uplink; and said step of determining a load measure for the uplink is based on said selected rise over thermal value.

3. The method according to claim 2, wherein said interference suppressing capability in said receiving node is achieved by a G-rake+ receiver.

4. The method according to claim 3, wherein said rise over thermal RoT for each respective user u is determined further based on an estimated noise floor for the uplink prior to interference suppression and SINR for user u after interference suppression.

5. The method according to claim 4, wherein said step of estimating a respective rise over thermal value RoT for each of said plurality of users is performed according to:

$$RoT_u^{G+} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right)$$

where
$RoT_u^{G+}$=rise over thermal for user u after interference suppression
$S_u^{G+}$=signal power for user u
$K_u^{G+}$=scale factor for user u
$\hat{N}$=estimated noise floor prior to interference suppression
$SF_{u,DPCCH}$=spreading factor of the DPCCH channel for user u
$\beta_{u,effective}^2$=total effective beta factor squared (data power offset) for user u
$SINR_u^{G+}$=SINR for user u after interference suppression and said step of selecting a highest uplink rise over thermal value is performed according to $$u_{max} = \underset{u}{\operatorname{argmax}}(RoT_u^{G+})$$

and said step of determining a load measure for said uplink is performed according to $\max(RoT_u^{G+})=RoT_{u_{max}}^{G+}$.

6. The method according to claim 2, wherein said interference suppressing capability in said receiving node is achieved by a frequency domain equalization (FDE) receiver.

7. The method according to claim 6, wherein said step of estimating a respective rise over thermal RoT for each of said plurality of users is further based on pre-equalized wideband signal for user u in the time domain, a wideband finite impulse response of the equalizing filter in the time domain for user u, and an estimated thermal noise floor of antenna branch a in the time domain, before equalization.

8. The method according to claim 7, wherein said step of estimating a respective rise over thermal RoT for each of said plurality of users u is performed according to $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)},$$

$$u = 1, \ldots, U$$

where
$RoT_u^{FDE}$=rise over thermal for user u after interference suppression
$z_{FDE,u}(t)$=pre-equalized wideband signal for user u in the time domain,
$w_u(l)$=wideband finite impulse response of the equalizing filter in the time domain for user u;
$\hat{N}_a^{thermal}$=estimated thermal noise floor of antenna branch a in the time domain, before equalization.

9. The method according to claim 1, wherein said interference suppressing capability in said receiving node is achieved by a linear receiver.

10. The method according to claim 1, wherein said interference suppressing capability in said receiving node is achieved by a frequency pre equalization (FDPE) receiver.

11. The method according to claim 10, wherein said step of estimating a rise over thermal RoT for said uplink is further based on a pre-equalized wideband signal in the time domain, a wideband finite impulse response of the pre-equalizing filter in the time domain, and an estimated thermal noise floor of antenna branch a in the time domain, before pre-equalization.

12. The method according to claim 11, wherein said step of estimating a rise over thermal RoT for said uplink is performed according to $$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}$$

where
$RoT^{FDPE}$=rise over thermal for the uplink after interference suppression
$z_{pre}(t)$=pre-equalized wideband signal in the time domain,
$w_{pre}(l)$=wideband finite impulse response of the pre-equalizing filter in the time domain;
$\hat{N}_a^{thermal}$=estimated thermal noise floor of antenna branch a in the time domain, before pre-equalization.

13. The method according to claim 12, wherein the step of determining a load measure for the uplink based on said estimated rise over thermal value is performed according to:

$$g_{level}(RoT^{IS}(t))$$

where $RoT^{IS}(t)$ represents the RoT value after interference suppression, and $g_{level}(\ldots)$ is the determined load measure.

14. The method according to claim 13, wherein the step of determining a load measure for the uplink based on said estimated rise over thermal value is performed according to:

$$g_{level}(RoT^{IS}(t))=RoT^{IS}(t)$$

where $RoT^{IS}(t)$ represents the RoT value after interference suppression, and $g(\ldots)$ is the determined load measure.

15. The method according to claim 14, wherein said method comprises the further step of determining a rate of change of said determined load measure according to $$g_{rate}(RoT^{IS}(t), RoT^{IS}(t-T)) = \frac{RoT^{IS}(t) - RoT^{IS}(t-T)}{T}$$

where $RoT^{IS}(t)$ represents the RoT value after interference suppression at time t, T is a RoT estimation sampling period, and $g_{rate}(\ldots)$ is rate of change of the determine load measure, and controlling interference congestion based on said rate of change of said determined load measure.

16. The method according to claim 1, wherein said interference congestion controlling step comprises performing inner loop power control on the uplink based on a comparison of said determined load measure to a predetermined threshold.

17. The method according to claim 16, wherein said interference congestion controlling step comprises overriding said inner loop power control and issuing at least one power down command to each of a selected set of users in response to said determined load measure exceeding a predetermined threshold.

18. An arrangement for interference congestion control in an interference suppression capable receiving node associated with a plurality of users of an uplink in a wireless communication system, the arrangement comprising:

an interference suppression unit configured to apply interference suppression to each of a plurality of received user signals in said node, to suppress other-user, same-band, interference to each received user signal, thereby providing interference suppressed received signals;

an estimating unit configured to estimate a rise over thermal value for said uplink, based on said interference suppressed received signals and an estimate of thermal noise;

a load determining unit configured to determine a load measure for the uplink based on said estimated rise over thermal value; and a control unit configured to control interference congestion on said uplink based on said determined load measure.

19. The arrangement according to claim 18, wherein said estimating unit is configured to estimate a respective rise over thermal value for each of said plurality of users on said uplink;

wherein said arrangement further comprises a selecting unit configured to select a highest rise over thermal value of said respective estimated rise over thermal values to represent the rise over thermal value for said uplink; and wherein said determining unit is configured to determine a load measure for the uplink based on said selected rise over thermal value.

20. The arrangement according to claim 19, wherein said arrangement comprises a G-rake+ receiver.

21. The arrangement according to claim 19, wherein said arrangement comprises an FDE receiver.

22. The arrangement according to claim 18, wherein said arrangement comprises a linear receiver.

23. The arrangement according to claim 18, wherein said arrangement comprises an FDPE receiver.

24. The arrangement according to claim 18, wherein said control unit is configured to perform inner loop power control on the uplink based on a comparison of said determined load measure to a predetermined threshold.

25. The arrangement according to claim 24, wherein said interference control unit is configured to override said inner loop power control and to issue at least one power down command to a selected set of users in response to said determined load measure exceeding a predetermined threshold.

* * * * *

UNITED STATES PATENT AND TRADEMARK OFFICE
CERTIFICATE OF CORRECTION

PATENT NO. : 9,106,319 B2
APPLICATION NO. : 13/306207
DATED : August 11, 2015
INVENTOR(S) : Wigren Page 1 of 1

It is certified that error appears in the above-identified patent and that said Letters Patent is hereby corrected as shown below:

In Column 5, Line 62, in Equation (12),
delete "$(L^H(m))^{-1}\hat{H}(m))=Wpre(m)((L(m))^{-1}\hat{H}(m))$" and
insert -- $(L^H(m))^{-1}((L(m))^{-1}\hat{H}(m))= Wpre(m)((L(m))^{-1}\hat{H}(m))$, --, therefor.

In Column 13, Line 47, delete "$I_k$," and insert -- $I_k$ --, therefor.

In Column 15, Line 21, delete "FDOE" and insert -- FDPE --, therefor.

In Column 22, Line 29, in Claim 10, delete "frequency" and insert -- frequency domain --, therefor.

Signed and Sealed this
Twenty-eighth Day of June, 2016

Michelle K. Lee
*Director of the United States Patent and Trademark Office*